United States Patent
Watanabe et al.

(10) Patent No.: US 12,486,554 B2
(45) Date of Patent: Dec. 2, 2025

(54) METHOD OF DETERMINING FINAL ANNEALING CONDITIONS FOR GRAIN-ORIENTED ELECTRICAL STEEL SHEET AND METHOD OF PRODUCING GRAIN-ORIENTED ELECTRICAL STEEL SHEET USING METHOD OF DETERMINING THEREOF

(71) Applicant: JFE STEEL CORPORATION, Tokyo (JP)

(72) Inventors: Makoto Watanabe, Tokyo (JP); Takashi Terashima, Tokyo (JP); Takuya Yamada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 330 days.

(21) Appl. No.: 18/264,928

(22) PCT Filed: Mar. 3, 2022

(86) PCT No.: PCT/JP2022/009253
§ 371 (c)(1),
(2) Date: Aug. 10, 2023

(87) PCT Pub. No.: WO2022/186357
PCT Pub. Date: Sep. 9, 2022

(65) Prior Publication Data
US 2024/0247333 A1 Jul. 25, 2024

(30) Foreign Application Priority Data
Mar. 3, 2021 (JP) .................. 2021-033961

(51) Int. Cl.
*C21D 11/00* (2006.01)
*C21D 1/26* (2006.01)
(Continued)

(52) U.S. Cl.
CPC ............... *C21D 11/00* (2013.01); *C21D 1/26* (2013.01); *C21D 3/04* (2013.01); *C21D 6/008* (2013.01);
(Continued)

(58) Field of Classification Search
None
See application file for complete search history.

(56) References Cited

U.S. PATENT DOCUMENTS 10,697,038 B2   6/2020   Nagoshi et al.
2018/0030559 A1  2/2018   Uesaka et al.
(Continued)

FOREIGN PATENT DOCUMENTS

CN   103060746 A   4/2013
JP   H02274817 A   11/1990
(Continued)

OTHER PUBLICATIONS

Feb. 14, 2024, Office Action issued by the Federal Service for Intellectual Property, Patents and Trademarks of the Russian Federation in the corresponding Russian Patent Application No. 2023124626 with English language search report.

(Continued)

*Primary Examiner* — Anthony M Liang
(74) *Attorney, Agent, or Firm* — KENJA IP LAW PC

(57) ABSTRACT

In determining the conditions for final annealing, information on the concentration of enriched components over the entire length and width of the steel sheet after decarburization annealing is obtained, the optimum function of product properties in the relationship between enriched components and control conditions for final annealing is obtained in advance, and the distribution of the control conditions for final annealing within the coil were considered while determining the control conditions for final annealing such that (Continued)

the area where the deviation of the product properties from the above optimum function is within a range of ±δ is maximized over the entire length and width.

8 Claims, 3 Drawing Sheets

(51) Int. Cl.
    *C21D 3/04*     (2006.01)
    *C21D 6/00*     (2006.01)
    *C21D 8/12*     (2006.01)
    *C21D 9/46*     (2006.01)
    *C22C 38/02*     (2006.01)
    *C22C 38/04*     (2006.01)

(52) U.S. Cl.
    CPC .......... *C21D 8/1222* (2013.01); *C21D 8/1233* (2013.01); *C21D 8/1255* (2013.01); *C21D 8/1266* (2013.01); *C21D 8/1272* (2013.01); *C21D 8/1283* (2013.01); *C21D 9/46* (2013.01); *C22C 38/02* (2013.01); *C22C 38/04* (2013.01)

(56) References Cited

U.S. PATENT DOCUMENTS

| | | |
|---|---|---|
| 2018/0066346 A1 | 3/2018 | Imamura et al. |
| 2020/0087746 A1 | 3/2020 | Omura et al. |
| 2022/0042153 A1 | 2/2022 | Watanabe et al. |

FOREIGN PATENT DOCUMENTS

| | | |
|---|---|---|
| JP | H05195239 A | 8/1993 |
| JP | H08209248 A | 8/1996 |
| JP | H093541 A | 1/1997 |
| JP | H09111346 A | 4/1997 |
| JP | H11140546 A | 5/1999 |
| JP | 2000239736 A | 9/2000 |
| JP | 2001303137 A | 10/2001 |
| JP | 2002194507 A | 7/2002 |
| JP | 2004292834 A | 10/2004 |
| JP | 2015190022 A | 11/2015 |
| JP | 2018100922 A | 6/2018 |
| JP | 2020169373 A | 10/2020 |
| KR | 1020060013177 A | 2/2006 |
| RU | 2534703 C2 | 12/2014 |
| RU | 2666393 C1 | 9/2018 |
| RU | 2714004 C1 | 2/2020 |
| WO | 2020067136 A1 | 4/2020 |

OTHER PUBLICATIONS

May 24, 2022, International Search Report issued in the International Patent Application No. PCT/JP2022/009253.

May 29, 2024, the Extended European Search Report issued by the European Patent Office in the corresponding European Patent Application No. 22763409.4.

Apr. 1, 2025, Office Action issued by the China National Intellectual Property Administration in the corresponding Chinese Patent Application No. 202280017476.9 with English language search report.

Sep. 22, 2025, Office Action issued by the Korean Intellectual Property Office in the corresponding Korean Patent Application No. 10-2023-7028809 with English language concise statement of relevance.

METHOD OF DETERMINING FINAL ANNEALING CONDITIONS FOR GRAIN-ORIENTED ELECTRICAL STEEL SHEET AND METHOD OF PRODUCING GRAIN-ORIENTED ELECTRICAL STEEL SHEET USING METHOD OF DETERMINING THEREOF

TECHNICAL FIELD

The present disclosure relates to a method of determining final annealing conditions for a grain-oriented electrical steel sheet, specifically, a method for determining the final annealing conditions for a grain-oriented electrical steel sheet to obtain a high-quality grain-oriented electrical steel sheet with a high yield by uniformly forming a base film mainly composed of forsterite and spinel in a rolling direction and a transverse direction of a coil.

The present disclosure also relates to a method of producing a grain-oriented electrical steel sheet using the method of determining final annealing conditions.

BACKGROUND

Electrical steel sheets are soft magnetic materials widely used as materials for transformers, motor cores, etc. Among the electrical steel sheets, grain-oriented electrical steel sheets are mainly used for iron cores of large transformers because a crystal orientation of the grain-oriented electrical steel sheets is highly aligned with the {110}<001> orientation, called the Goss orientation, and therefore the grain-oriented electrical steel sheets have excellent magnetic properties.

Each grain-oriented electrical steel sheet is generally produced by subjecting steel material containing a high Si content to hot rolling, and then cold rolling to obtain a cold-rolled sheet, subjecting the cold-rolled sheet to decarburization annealing, then applying an annealing separator mainly composed of MgO, and then subjecting the cold-rolled sheet to final annealing. A high degree of alignment in the Goss orientation is achieved by holding the cold-rolled sheet at a high temperature of 800° C. or more for a long time during the final annealing to cause secondary recrystallization.

In final annealing, after the secondary recrystallization has occurred, the cold-rolled sheets are heated to a high temperature of about 1200° C. to expel impurities from within the steel material, and an internal oxidation film formed during the decarburization annealing process is reacted with an annealing separator mainly composed of MgO to form a forsterite-based base film.

The base film has an effect of reducing iron loss by imparting tension to the steel sheet and also functions as a binder for a later-applied insulating film, contributing to an improvement in insulation properties and corrosion resistance of the steel sheet.

The internal oxidation film formed during decarburization annealing is affected by complex oxidation behavior because the internal oxidation film is affected by residual oxides from a previous process and a texture of the steel sheet surface, by oxidation occurring in a non-equilibrium reaction, and by decarburization occurring simultaneously with oxidation. Since decarburization annealing also involves annealing at a high dew point, maintaining a uniform atmosphere in the furnace is extremely difficult, and uneven oxidation tends to occur on front and back surfaces of the steel sheet and at edges and a center of the coil.

On the other hand, during final annealing, steel sheets are wound into coils and placed upended in a final annealing furnace such that the coil axes are vertical, and held at high temperatures for a long time, resulting in temperature irregularities within the coils. The temperature irregularities cause variations in film properties in the rolling direction and sheet transverse direction of each of the coils.

In particular, outer edges of upper and lower ends of upended coils overheat during final annealing, resulting in defects such as the base film peeling and point-like defects. As a result, the product yield rate tended to decrease.

To solve these issues, various technologies have been proposed to improve magnetic properties and film properties, particularly by devising conditions for final annealing. For example, JP 2000-239736 A (PTL 1) proposes a method of promoting purification of steel sheets by repeatedly increasing and decreasing furnace pressure in a specific temperature range during final annealing.

JP 2001-303137 A (PTL 2) proposes a method of improving coil shapes by using MgO with a limited angle of repose and bulk as an annealing separator and by optimizing the winding tension of the coils after applying an annealing separator.

JP H08-209248 A (PTL 3) proposes a method of suppressing deterioration of magnetic properties and film properties by using a sealing material with a specific grain size at a lower end of an inner cover when performing final annealing in a box furnace with a rotating furnace hearth.

JP H09-003541 A (PTL 4) and JP H09-111346 A (PTL 5) propose methods of increasing a flow rate of atmospheric gas in final annealing to increase tension imparted to base films in Bi-doped steel sheets.

CITATION LIST

Patent Literature

PTL 1: JP 2000-239736 A
PTL 2: JP 2001-303137 A
PTL 3: JP H08-209248 A
PTL 4: JP H09-003541 A
PTL 5: JP H09-111346 A

SUMMARY

Technical Problem

However, when the pressure is lowered in the method described in PTL 1, there is a risk of localized negative pressure in the annealing furnace occurring, causing air to enter the furnace, resulting in abnormal combustion of atmospheric gases and deterioration of film properties.

Although the method described in PTL 2 improves the coil shape to some extent, there is a risk of magnetic properties and film properties deteriorating due to an increase in winding tension causing tightening of the coil, resulting in poor atmospheric gas flow between the coil layers.

The method of limiting the particle size of the sealing material described in PTL 3 to a specific size and the methods of increasing the gas flow rate described in PTL 4 and PTL 5 are also limited in their improvements of magnetic properties and film properties, and a problem not achieving sufficient improvement effects still remains.

As mentioned above, the application of techniques described in the patent literature has indeed gradually improved film properties and magnetic properties.

However, these improvements are still not enough to meet the stringent quality requirements of recent years. In particular, defects in properties of the base film that occur at the upper portion or lower portion of the coil (both ends in the coil transverse direction) or at the inner winding portion and outer winding portion (both ends in the coil rolling direction) during the final annealing process must be trimmed off before shipping the product. This results in a decrease in yield rate, leading to an increase in production cost of grain-oriented electrical steel sheets.

The present disclosure was developed in consideration of the above issues with conventional techniques, and is helpful in providing a method of determining final annealing conditions for a grain-oriented electrical steel sheet of high quality that meets the above-mentioned strict quality requirements in recent years, and a method of producing the grain-oriented electrical steel sheet using the above method of determining thereof, by imparting good film properties even in areas where the properties of a base film, such as forsterite, tend to deteriorate, such as the upper and lower portions and the inner and outer winding portions of a coil during final annealing.

Solution to Problem

As a result of conducting diligent investigations to address these issues, the inventors found that:
  the concentration of each of O, Si, Al, Mn, and P in decarburization annealed sheets, or the state (intensity ratio) of the enriched components of the internal oxidation film including $Fe_2SiO_4$, $SiO_2$, and FeO in the oxide product components, and the final annealing conditions all differing depending on their location within the coil causes a decrease in yield rate,
  that reducing intra-coil variations in the state of the enriched components of such internal oxidation films and in the conditions of final annealing is difficult with current manufacturing equipment, and
  that if a good base film can be obtained by adjusting the conditions of final annealing depending on the state of the enriched components of the internal oxidation film, reducing the deterioration of properties of the base film in the coil is possible.

Based on these findings, the inventors further investigated and constructed a control model that optimizes yield rate based on the state of enriched components in the internal oxidation film and intra-coil variations in the conditions of final annealing.

In other words, the primary features of the present disclosure are as follows:
1. A method of determining final annealing conditions for a grain-oriented electrical steel sheet in a process of producing the grain-oriented electrical steel sheet, the process comprising subjecting steel material for the grain-oriented electrical steel sheet to hot rolling to obtain a hot-rolled steel sheet, then subjecting the hot-rolled steel sheet to cold rolling once or cold rolling twice or more with intermediate annealing performed therebetween to obtain a cold-rolled steel sheet, and then subjecting the cold-rolled steel sheet to decarburization annealing which also serves as primary recrystallization annealing, applying an annealing separator to the cold-rolled steel sheet, winding the cold-rolled steel sheet into coil form and then subjecting the cold-rolled steel sheet to final annealing to form a base film, and then flattening annealing to obtain a product sheet,
  wherein when determining the conditions of the final annealing, the method of determining the final annealing conditions comprises:
  1) dividing, after the decarburization annealing, the steel sheet into a plurality of sections in a rolling direction and a transverse direction, and for each section, obtaining information on an enriched component index (M) in an internal oxidation film in the steel sheet after the decarburization annealing;
  2) deriving, prior to the determining of the conditions for the final annealing and based on evaluation results of effect of control items for the final annealing on properties of the base film, an optimum function f(M) of the control items for the final annealing to the enriched component index (M) of the final annealing with respect to an enriched component;
  3) obtaining, for the entire steel sheet, information on a distribution of the control items of each section for a plurality of candidate values that are set values (H) of the control items for the final annealing; and
  4) determining whether the distribution of the control items for each section is within a predetermined tolerance ($\pm\delta$) to f(M) and selecting, from the plurality of candidate values, the set values (H) of the control items where the total area of the sections within the tolerance value is a maximum.
2. The method of determining the final annealing conditions for a grain-oriented electrical steel sheet according to aspect 1, wherein the enriched component index (M) is one or more of O concentration, Si concentration, Al concentration, Mn concentration, P concentration, $Fe_2SiO_4$ intensity ratio, $SiO_2$ intensity ratio, and FeO intensity ratio on the steel sheet surface.
3. The method of determining the final annealing conditions for a grain-oriented electrical steel sheet according to aspect 1 or 2, wherein the control items for the final annealing are one or more of a final annealing heating rate in a range of 950° C. to 1100° C., an atmosphere switching temperature, a soaking time, and a soaking temperature.
4. A method of producing a grain-oriented electrical steel sheet, comprising using the method of determining the final annealing conditions according to any one of aspects 1 to 3.

Advantageous Effect

The present disclosure enables a stable production of grain-oriented electrical steel sheets with excellent properties of the base film regardless of the position in the rolling or transverse directions of the coil. Therefore, the present disclosure contributes greatly to improving product quality, increasing yield rate, and reducing production costs.

BRIEF DESCRIPTION OF THE DRAWINGS

In the accompanying drawings.

DETAILED DESCRIPTION

The following describes the experiments that led to the development of the of the present disclosure.

Experiment 1

Steel containing C: 0.06 mass %, Si: 3.3 mass %, Mn: 0.07 mass %, Al: 0.016 mass %, S: 0.003 mass %, with the balance being Fe and inevitable impurities is melted to obtain steel material (slab) by continuous casting. The slab is then heated to 1380° C., subjected to hot rolling to a sheet thickness of 2.2 mm to obtain a hot-rolled sheet. The hot-rolled sheet is subjected to annealing under conditions including 1000° C. for 60 seconds, then primary cold rolling to an intermediate sheet thickness of 1.8 mm and annealing under a set of conditions including 1100° C. for 80 seconds, and then secondary cold rolling to obtain a cold-rolled sheet with a final sheet thickness of 0.23 mm.

Next, using a horizontal (sideways) continuous annealing furnace, the cold-rolled sheet is subjected to decarburization annealing, which also serves as primary recrystallization annealing, in which the cold-rolled sheet is heated in a heating process at a heating rate of 100° C./s in a range of 500° C. to 700° C., further heated to 860° C., and then held at that temperature for 140 seconds. In the decarburization annealing, atmosphere gas with a vol % ratio of $H_2:N_2=60:40$ was supplied from above and below the annealing furnace.

Figure 1:
FIG. 1 illustrates mapping the distribution of P-intensity over the entire length and the entire width of the coil.

After the decarburization annealing is completed and before the steel sheet is wound into a coil, the steel sheet is subjected to an on-line X-ray fluorescence system to analyze the intensity of P, one of the enriched components in the internal oxidation film (such intensity is the intensity of the X-rays, which is proportional to the concentration (or amount of concentration). Therefore, in the present disclosure, intensity, and concentration (amount of concentration) may be considered to be synonymous). The energy-dispersive type X-ray fluorescence device was used under a set of conditions including a voltage of 50 kv and a current of 10 mA. The P-intensity was analyzed every 50 mm in the sheet transverse direction and every 50 m in the rolling direction to create a distribution map of X-ray P-intensities. This map is illustrated in FIG. 1. The total length of the coil is 5000 m and the total width of the coil is 1000 mm.

The same figure illustrates that the X-ray P-intensities of the steel sheet vary gradually in a range of 1.4 kcps to 2.6 kcps in both the rolling and transverse directions. This is thought to be due to the influence of the flow of atmosphere gases in the annealing furnace and the surface properties of the steel sheet in the previous process.

After such decarburization annealing, an annealing separator, which is a slurry of powder in water mainly composed of MgO and containing 5 mass % titanium dioxide and 0.1 mass % sodium borate, is applied to the steel sheet surface of the cold-rolled sheet, and the cold-rolled sheet is then dried and wound into coil form for final annealing.

Figure 2:
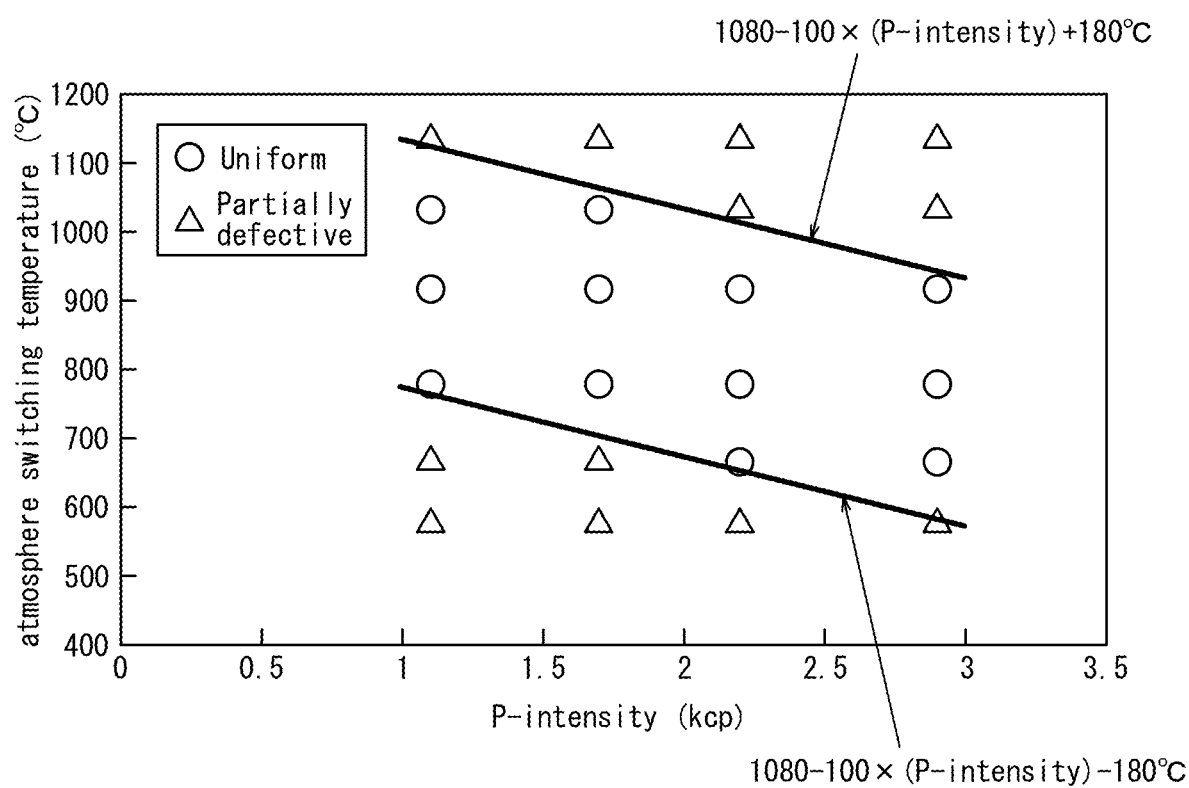
FIG. 2 illustrates the relationship between the atmosphere switching temperature and the film properties with respect to the P-intensity of steel sheets.

Next, final annealing was performed on the cold-rolled sheet by varying the atmosphere switching temperature, one of the control items in the final annealing, to form a base film on the steel sheet surface. The uniformity of the base film on the product sheet after final annealing was evaluated. FIG. 2 illustrates the results and organizes the results in relation to the intensity of P in the internal oxidation film of the steel sheet after decarburization annealing and the atmosphere switching temperature. The uniformity of the base film was evaluated as "uniform" when the film thickness is constant and uniform in appearance, and as "partially defective" when areas where the thickness is thinner than the surrounding area are present.

From the above experimental results, the inventors found that a good film can be obtained if the atmosphere switching temperature, one of the control items in final annealing, is kept within an appropriate range according to P-intensity.

This means that the more P is enriched and the lower the atmosphere switching temperature, the easier it is for the formation of the base film to occur. Therefore, if the amount of P concentration is high and the atmosphere switching temperature is low, the formation of the base film is excessively promoted, resulting in areas where the base film is locally excessive. These areas are prone to peeling off which deteriorates the properties of the base film. On the other hand, the inventors believe that if the amount of P concentration is low and the atmosphere switching temperature is high, the formation of the base film is delayed, resulting in an overall thinner base film, and in this case, the base film also deteriorates.

FIG. 2 illustrates that in the relationship between the P-intensity of the internal oxidation film and the atmosphere switching temperature, the region where the uniformity of the base film is maintained is in a range of $1080-100\times(P\text{-intensity})-180°$ C. to $1080-100\times(P\text{-intensity})+180°$ C. In other words, the optimum value of the atmosphere switching temperature for final annealing (also called simply the optimum value in the present disclosure) can be calculated from $1080-100\times(P\text{-intensity})$ (also called the optimum function f(M) in the present disclosure), and it was found that a good base film is formed if the difference (referred to as the tolerance δ in the present disclosure) between the optimum value and an actual $H_2$ switching temperature (referred to as the set value (H) in the present disclosure), which is provided by the $H_2$ switching temperature for final annealing at a later-described representative point, is within 180° C. Therefore, the uniformity of the base film can be maintained by adjusting the atmosphere (e.g., $H_2$) switching temperature of the final annealing according to the P-intensity of the internal oxidation film.

The representative point is a point measured with a thermocouple attached to a furnace hearth at a location where the furnace hearth contacts a lower portion of a coil intermediate winding.

The set value (H) in the present disclosure may include the temperature actually reached by the steel sheet, i.e., the output value, such as the actual atmosphere switching temperature mentioned above as an example, but set value (H) may also be a so-called input value such as a command temperature (set temperature) or the value of something actually controlled such as the amount of fuel gas or amount of applied power. Any of the above values can be used as appropriate in the present disclosure as long as the values are consistent in a single simulation.

Next, to simulate the heating pattern of final annealing, a separately—prepared coil after application of the annealing separator was used and final annealing was performed with a plurality of thermocouples attached to the coil, and the temperature inside the coil was simulated using the finite element method based on the temperature data at that time.

In the final annealing at this time, the cold-rolled steel sheet was heated in a range of room temperature to 950° C. at a rate of 25° C./h in a $N_2$ atmosphere, and in a range of 950° C. to 1100° C. at a rate of 20° C./h in a $H_2$ atmosphere to complete secondary recrystallization. Then, the cold-rolled steel sheet was subjected to purification treatment by heating in a range of 1100° C. to 1200° C. at a rate of 10° C./h in a $H_2$ atmosphere and holding the temperature at 1200° C. for 10 h. Each of the above-mentioned temperatures and the temperatures for annealing below are described as the representative temperature for control (temperature of the representative point) at the thermocouple attached to the furnace hearth in contact with the lower portion of the coil.

Figure 3:
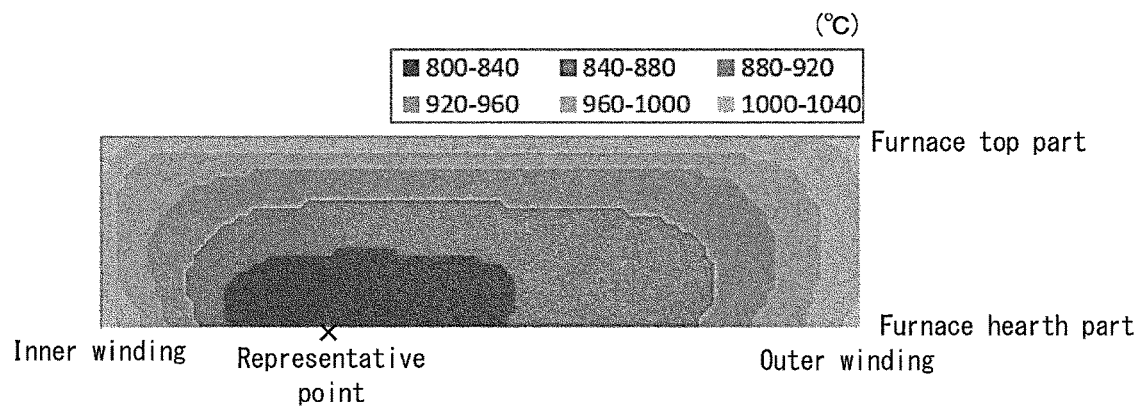
FIG. 3 illustrates a simulated temperature distribution at a representative point of 830° C. during final annealing in a coil.

FIG. 3 illustrates the results of the finite element method simulation of the temperature distribution of the entire steel sheet in the coil in such a heat pattern when the temperature at the representative point during the annealing process is 830° C. This figure also illustrates results in increments of 50 mm pitch in the transverse direction and 50 m pitch in the rolling direction. The total length of the coil is 5000 m and the total width of the coil is 1000 mm.

The results in FIG. 3 illustrate that the temperature is lowest near the representative point slightly below the center of the sheet width in the coil intermediate winding portion, and that the difference between the highest temperature and lowest temperature is about 200° C.

Based on these results, the inventors continued further with the experiment according to the following procedure.

That is, the appropriate temperature for switching the atmosphere from $N_2$ to $H_2$ was calculated from the P-intensity at each coil position using the aforementioned formula, 1080-100×(P-intensity). The simulated temperatures at each coil position at each time of the atmosphere switching temperatures at 700° C., 800° C., and 900° C., which were set as candidate values ($h_0$, $h_1$, and $h_2$), were also calculated. The difference, Δ, between the calculated appropriate temperature for switching from $N_2$ to $H_2$ and the simulated temperature at each coil position was then mapped and displayed. The results are illustrated in FIG. 4.

Figure 4:
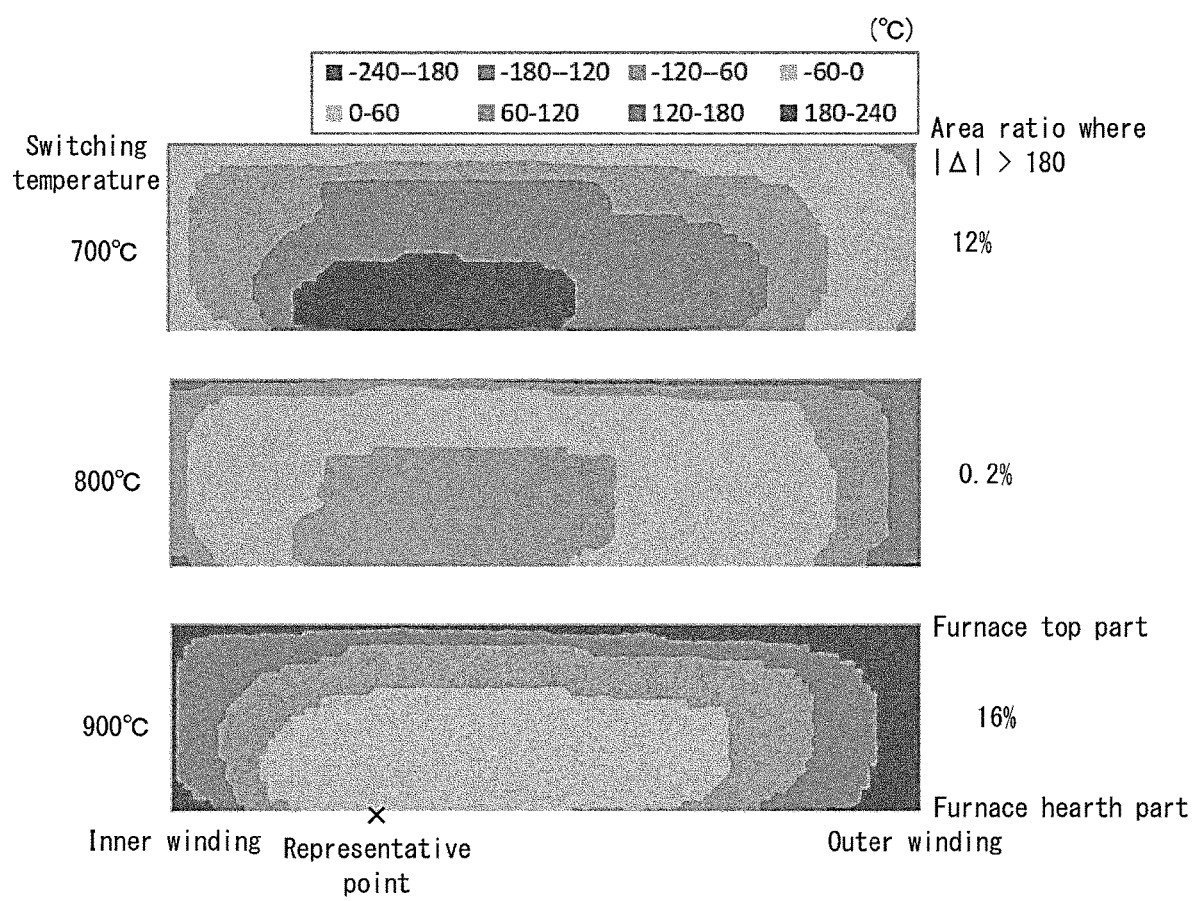
FIG. 4 illustrates mapping the difference between a calculated optimum atmosphere switching temperature assumed from the P-intensity of the entire length and the entire width of the coil and an estimated temperature obtained from a calculation at each coil position at the time of the atmosphere switching temperature at 700° C., 800° C., and 900° C.

As can be seen from FIG. 4, when the atmosphere switching temperature was set to 700° C., a wide range of regions where the absolute value of A exceeded 180° C. (8 mentioned above) was observed throughout the steel sheet on the coil intermediate winding furnace hearth side. At a setting of 900° C., regions where the absolute value of A exceeded 180° C. (8 mentioned above) occurred in the outermost and innermost windings. In contrast, at the middle temperature of 800° C., the absolute value of A was within a range of 180° C. (δ mentioned above) or less for 99.8% of the total area of the steel sheet, except for a very small area at the coil edges.

Therefore, the results illustrate that final annealing at an atmosphere switching temperature of 800° C. was best for the above coils. In other words, the results of this experiment illustrate that the set value (H) of the atmosphere switching temperature can be set to 800° C. The final annealing conditions were the same as those described above except for the atmosphere switching temperature.

The annealing separator was then removed, and a coating mainly composed of phosphate was applied to the cold-rolled sheet which was subjected to flattening annealed which also serves as baking. A coating appearance of the coil was determined by a surface inspection device, and the coating was deemed acceptable when the coating was uniform in appearance with no uneven coloration or point-like coating defects. The results illustrated that a high film pass rate of 99.7% was obtained. Since the insulating film (in this case, a glass film mainly composed of phosphate) is transparent in this evaluation, the film pass rate can be regarded as an evaluation of the properties of the base film.

As described above, for each coil, the inventors performed experiments on 10 coils each under conditions in which the atmosphere switching temperature was changed as described above using the method of the present disclosure, and under conditions in which the atmosphere switching temperature was kept constant at 800° C. as a comparison, and then compared the coating appearance. As a result, the inventors found that the film pass rate was as high as 99.7% when the atmosphere switching temperature was adjusted for each coil, whereas the film pass rate was only 91.3% when the switching temperature was kept constant at 800° C. Optimizing the switching temperature for each coil was also found to significantly improve the film pass rate.

The film pass rate is a percentage of surface area of the coil that has a uniform appearance. For example, if the surface area of the evaluated coil is 100,000 $m^2$ and the surface area of the portion that passed the test is 90,000 $m^2$, the pass rate is 90.0%.

In other words, conventionally, the atmosphere switching temperature during final annealing was controlled using a single representative point, and although the film properties were good at that representative point, there were defective areas when viewed over the entire length and width of the coil, making it difficult to obtain good quality steel sheets at a high yield rate.

In contrast, by performing final annealing in accordance with the present disclosure under the set value (H) of the control item (e.g., the atmosphere switching temperature of the final annealing) that is not directed to a local optimum value but to a range where the range of good film properties is maximized with the area of the steel sheet rolled into a coil (hereinafter simply referred to as coil area), an effect of significantly improving the manufacturing yield was obtained.

As a procedure for maximizing the range of good film properties in the coil area, the present disclosure selects in advance a plurality of suitable control items that have been conventionally used, together with candidate setting values ($h_0$, $h_1$, $h_2$ . . . ), and it is most efficient to obtain a setting value (H) from these candidate setting values ($h_0$, $h_1$, $h_2$ . . . ) with the relationship between f(M) and & as described above.

The procedure for evaluating the base film in a laboratory, may include varying the target enriched component and control items, formulating a relationship between the amount of enriched components and the control items that optimize the properties of the base film, determining the appropriate control items for each section based on the amount of enriched component, and selecting from a histogram of candidate control item setting values against the number of sections, the candidate control item setting value that results in the largest number of sections, and adopting the selected value as the control item setting value (H) for the final annealing process. Final annealing may refer to final annealing that includes soaking, or a case in which soaking and final annealing are performed separately but may also refer to simply final annealing.

Alternatively, the same process can be performed by determining a relationship formula that results in a good film from the value of the enriched component and the value of the control item in actual production.

These relationships may be quantified in advance, either experimentally in a laboratory or by analyzing production quality data, and the set value (H), which is a condition of the control item for final annealing, is determined in consideration of these relationships. In addition to the above-described atmosphere switching temperature, one or more of the following control items can be used: a heating rate in a range of 950° C. to 1100° C. for final annealing, soaking time, and soaking temperature. In the present disclosure, control item means one or more items selected as appropriate from the above four items.

The following describes the general procedure of the disclosure.

First, the concentration of enriched components in the internal oxidation film formed during decarburization annealing is derived for each section, each of which is defined by a fixed area in the sheet transverse direction and rolling direction, of the steel sheet, for example by monitoring or calculation (the concentration of the enriched components is M).

Next, the effect of the control items of the final annealing on the properties of the base film is evaluated for M.

Based on the results of such evaluation, a relationship f(M) between the above M and the above control items that results in good properties of the base film is determined, and a tolerance $\pm\delta$ that results in good properties of the base film is also determined.

A plurality of candidate values ($h_0$, $h_1$, $h_2$ . . . ) is selected in the same manner as in the previous step.

The actual (or calculated) distribution of control items on the steel sheet, given by setting each of a plurality of candidate setting values ($h_0$, $h_1$, $h_2$ . . . ) for control items for final annealing, for each section defined by a fixed area in the sheet transverse direction and rolling direction, of the steel sheet, is obtained for example by monitoring or by calculation.

The smaller the area of the above fixed area in the present disclosure, the more detailed the response will be, but the resolution of the monitoring equipment and the accuracy of the final annealing simulation may make it impossible to obtain effective data if the area is too small. Therefore, using a pitch range of 1 mm to 400 mm in the transverse direction and 5 m to 200 m in the rolling direction is practical and desirable.

Using the above results, the following procedure is used to select the set value (H) of the control item that maximizes the total area of the sections that fall within the above tolerance $\pm\delta$ from the above candidate set values ($h_0$, $h_1$, $h_2$ . . . ).

That is, the enriched components in the internal oxidation film, which are the above-described monitoring index [enriched component index (M)], are as described above. In conjunction with monitoring the concentration of such enriched components in the coil after decarburization annealing, the optimum values, which depend on the coil position, for the control items for final annealing are derived as described above.

Next, the above-mentioned function f(M), the candidate values $h_0$, $h_1$, $h_2$ . . . , and the tolerance $\pm\delta$, are used with the method described above to set the set value (H) from the candidate values ($h_0$, $h_1$, $h_2$ . . . ) of the control item such that the total area of the section, which is given by $|f(M)-h_0|\leq\delta$, is maximized over the entire coil.

As mentioned above, one or more of the following control items can be used: a heating rate in a range of 950° C. to 1100° C. for final annealing, atmosphere switching temperature, the soaking time, and the soaking temperature. This is because the optimum range for these items is likely to change and depends particularly on the quality of the decarburization annealed sheet.

The relationship, f(M), between the control item and the monitoring index (concentration M) and $\delta$ can be obtained in advance in a laboratory or by data analysis of results from actual equipment.

The method of obtaining f(M) is not particularly limited, but specifically, when using the results of laboratory experiments, a regression equation may be obtained by using an X-ray fluorescence analyzer or FTIR to calculate the enriched components of the decarburization annealed sheet and based on the results of observing the coating appearance of the product sheet obtained by varying the conditions of final annealing to be adjusted. Alternatively, the regression equation may be obtained based on the results of adhesion tests conducted on the above product sheet in accordance with Japanese Industrial Standards (JIS) C2550 to evaluate film adhesion for each condition of final annealing. On the other hand, if data analysis is used, a regression equation for the film adhesion pass rate can be obtained using a comparison of the intensities of the enriched components in the decarburization annealed sheet with the conditions of final annealing and the above-described pass rate criteria for the film pass rate.

When using the results of laboratory experiments in the above method of obtaining $\delta$, the same equipment used in the above method of obtaining f(M) is used, and the test results include, for example, in the case of the coating appearance, using visual inspection as the standard for judging pass/fail, and in the case of the JIS C2550 adhesion test, using the passing test value set for each user as the standard. A range in which the base film is considered good can be obtained by taking the parameter ±about 20, and then halving the value in that range to obtain $\delta$. On the other hand, if data analysis is used, the same equipment and analysis tools used in the above method for obtaining f(M), as well as the acceptance criteria for the above film pass rate in the laboratory are used, and a range in which the base film is considered good can be obtained by taking the parameter ±about 20, and then halving the value in that range to obtain $\delta$. The optimal values and ranges are not limited to mathematical formulation using linear regression and may also be set using various machine learning algorithms such as SVM, random forests, and principal component analysis.

Next, other requirements in the present disclosure are described.

The steel material (slab) to be used in the production of grain-oriented electrical steel sheets with final annealing whose conditions are determined using the present disclosure may be any conventionally known steel material used in the production of grain-oriented electrical steel sheets. The specific chemical composition of the steel material is as follows.

C: 0.01 Mass % to 0.10 Mass %

If a C content is less than 0.01 mass %, grain boundary strengthening effects due to the C content is poor, and defects which hamper production such as slab cracking appear. On the other hand, if the C content exceeds 0.10 mass %, reducing the C content to 0.004 mass % or less, which does not cause magnetic aging by decarburization annealing, is difficult. Therefore, the C content is preferably 0.01 mass % or more. The C content is preferably 0.10 mass % or less. More preferably, the lower limit of the C content is 0.02 mass %, and the upper limit of the C content is 0.08 mass %.

Si: 2.5 Mass % to 4.5 Mass %

Si is an element necessary to increase the specific resistance of the steel and reduce iron loss. Such an effect is insufficient if a Si content is less than 2.5 mass %, whereas if the Si content exceeds 4.5 mass %, workability of the steel material decreases and production of steel sheets by rolling becomes difficult. Therefore, the Si content is preferably 2.5 mass % or more. The Si content is preferably 4.5 mass % or less. More preferably, the lower limit of the Si content is 2.8 mass % and the upper limit of the Si content is 3.7 mass %.
Mn: 0.01 Mass % to 0.50 Mass %

Mn is an element necessary to improve the hot workability of steel. The above effect is insufficient if a Mn content is less than 0.01 mass %. If the Mn content exceeds 0.50 mass %, the magnetic flux density of the product sheet decreases. Therefore, the Mn content is preferably 0.01 mass % or more. The Mn content is preferably 0.50 mass % or less. More preferably, the lower limit of the Mn content is 0.02 mass %, and the upper limit of the Mn content is 0.20 mass %.

Components other than the above C, Si, and Mn, differ depending on whether an inhibitor is used to produce secondary recrystallization and whether no inhibitor is used.

First, when using inhibitors to produce secondary recrystallization, for example, when using an AlN-based inhibitor, the Al content in the inhibitor is preferably 0.01 mass % or more. The Al content in the inhibitor is preferably 0.04 mass % or less. The N content in the inhibitor is preferably 0.003 mass % or more. The N content in the inhibitor is preferably 0.015 mass % or less. When using a MnS/MnSe-based inhibitor, the inhibitor includes, in addition to the aforementioned amounts of Mn, one or both of S and Se in which the S content is preferably 0.002 mass % or more. The S content is preferably 0.03 mass % or less. The Se content is preferably 0.003 mass % or more. The Se content is preferably 0.03 mass % or less. If the added amount of each is less than their respective lower limit, the inhibitor effect is insufficient. On the other hand, if the added amount of each exceeds their respective upper limit, the inhibitor remains undissolved during slab heating, resulting in a decrease in magnetic properties. AlN-based and MnS/MnSe-based inhibitors may be used together.

On the other hand, if inhibitors are not used to produce secondary recrystallization, it is preferable to use a steel material in which the inhibitor-forming components mentioned above, Al, N, S, and Se, are reduced as much as possible and to the following limits, respectively, Al: less than 0.01 mass %, N: less than 0.005 mass %, S: less than 0.005 mass %, and Se: less than 0.005 mass %.

Aside from the above components, the balance used in the steel material used in the present disclosure is substantially Fe and unavoidable impurities. In addition to the above components, the chemical composition of the steel material may further comprise one or more of Ni: 0.010 mass % to 1.50 mass %, Cr: 0.01 mass % to 0.50 mass %, Cu: 0.01 mass % to 0.50 mass %, P: 0.005 mass % to 0.50 mass %, Sb: 0.005 mass % to 0.50 mass %, Sn: 0.005 mass % to 0.50 mass %, Bi: 0.005 mass % to 0.50 mass %, Mo: 0.005 mass % to 0.100 mass %, B: 0.0002 mass % to 0.0025 mass %, Te: 0.0005 mass % to 0.0100 mass %, Nb: 0.0010 mass % to 0.0100 mass %, V: 0.001 mass % to 0.010 mass %, Ti: 0.001 mass % to 0.010 mass %, and Ta: 0.001 mass % to 0.010 mass %.

Next, the following describes the method of producing grain-oriented electrical steel sheets with final annealing, whose conditions are determined using the present disclosure.

A slab to be used as steel material in the above production method may be produced by smelting steel having the above-described chemical composition in a conventional refining process, followed by known ingot-rolling or continuous casting, or produced directly by direct casting to obtain a thin slab of 100 mm or less in thickness.

The above slab is subjected to heating at a predetermined temperature according to a conventional method, for example, to a temperature of about 1400° C. if the slab contains inhibitor-forming components, or specifically to a temperature of 1300° C. to 1450° C. to dissolve the inhibitor-forming components in the steel, and then subjected to hot-rolling to obtain a hot-rolled sheet.

On the other hand, if inhibitor-forming components are not included in the steel slab, the steel slab is subjected to heating to a temperature of 1250° C. or less and then hot-rolling to obtain hot-rolled sheets. If the steel slab contains no inhibitor components, the steel slab may be subjected to casting and then immediate hot rolling without heating.

When a thin slab is used, hot rolling may be performed, or hot rolling may be omitted and the next process of hot-rolled sheet annealing may be performed, or if hot-rolled sheet annealing is not performed, the thin slab may proceed to a process of cold rolling. The conditions for hot rolling may be in accordance with conventional methods with no particularly restrictions.

After the thin slab is subjected to hot rolling to obtain a hot-rolled sheet, the hot-rolled sheet is optionally subjected to hot-rolled sheet annealing. To obtain good magnetic properties, the soaking temperature of hot-rolled sheet annealing is preferably 800° C. or more. The temperature is preferably 1150° C. or less. If the soaking temperature is less than 800° C., the effect of hot-rolled sheet annealing is insufficient, and a band texture formed during hot rolling may remain, resulting in failure to obtain a primary recrystallization microstructure of uniformly-sized grains, which may inhibit development of secondary recrystallization. On the other hand, if the soaking temperature exceeds 1150° C., the grain size after the hot-rolled sheet annealing becomes too coarse, still making obtaining a primary recrystallized structure of uniformly-sized grains difficult.

After hot rolling or hot-rolled sheet annealing, the hot-rolled sheet or thin slab is subjected to cold rolling once, or cold rolling twice or more with intermediate annealing performed therebetween, to obtain a cold-rolled sheet with a final sheet thickness. The annealing temperature of intermediate annealing is preferably 900° C. or more. The annealing temperature is preferably 1200° C. or less. If the annealing temperature is less than 900° C., recrystallized grains after intermediate annealing become finer, and further the Goss nuclei in the primary recrystallization microstructure may decrease, resulting in the magnetic properties of the product sheet decreasing. On the other hand, if the annealing temperature exceeds 1200° C., as in the hot-rolled sheet annealing, crystal grains become too coarse, making obtaining a primary recrystallization structure of uniformly-sized grains difficult.

The cold rolling, in which the final thickness is obtained (final cold rolling), employs warm rolling, in which the steel sheet temperature increases to 100° C. to 300° C., and subjects the steel sheet to one or more passes of aging treatment in which the temperature is preferably 100° C. or more during cold rolling. The temperature is preferably 300° C. or less during cold rolling. This improves the primary recrystallized texture and further enhances the magnetic properties of the steel sheet.

The cold-rolled sheet having a final sheet thickness is then subjected to decarburization annealing which also serves as primary recrystallization annealing. The heating process of the above decarburization annealing is subjected to rapid heating in a range of 500° C. to 700° C. up to the soaking temperature in which the heating rate is preferably 50° C./s or more. This refines secondary recrystallized grains and improves iron loss properties. The soaking temperature at which decarburization annealing is performed is preferably 780° C. or more. The soaking temperature is preferably 950° C. or less. The soaking time is preferably 80 seconds or more. The soaking time is preferably 200 seconds or less. If the soaking temperature is lower than 780° C. or the soaking time is shorter than 80 seconds, insufficient decarburization or insufficient primary grain growth occurs. On the other hand, if the soaking temperature exceeds 950° C. or the soaking time exceeds 200 seconds, the grain growth of primary recrystallized grains may be excessive. The soaking temperature is more preferably 800° C. or more. The soaking temperature is more preferably 930° C. or less. The soaking time is more preferably 90 seconds or more. The soaking time is more preferably 150 seconds or less.

The atmosphere during soaking in decarburization annealing is preferably a humid hydrogen atmosphere with an adjusted dew point and an oxygen potential $PH_2O/PH_2$ of 0.3 or more. The oxygen potential $PH_2O/PH_2$ is preferably 0.6 or less. If $PH_2O/PH_2$ is less than 0.3, decarburization is insufficient, while if $PH_2O/PH_2$ exceeds 0.6, FeO tends to form on the steel sheet surface and film properties deteriorate. $PH_2O/PH_2$ is more preferably 0.4 or more. $PH_2O/PH_2$ is more preferably 0.55 or less. The oxygen potential $PH_2O/PH_2$ of the atmosphere during heating in decarburization annealing need not be the same as during soaking and may be controlled separately.

Furthermore, the atmosphere during soaking need not be constant. For example, the soaking process can be divided into two stages, and the oxygen potential $PH_2O/PH_2$ in a latter stage may be reduced to 0.2 or less. This improves the morphology of the internal oxidation film formed on the steel sheet surface layer, which is advantageous for improving magnetic properties and film properties. More preferably, $PH_2O/PH_2$ in the latter stage is 0.15 or less. The proportion of time in an earlier stage and the latter stage is not limited, but the latter stage is preferably 25% or less of the time of the earlier stage.

In the present disclosure, it is important to monitor a specific index [enriched component index (M)] in the internal oxidation film of the decarburization annealed sheet in the transverse direction and rolling direction. As the specific index [index of enriched components (M)] for the internal oxidation film, for example, the detection intensities of elements O, Si, Al, Mn, and P by X-rays, gamma rays, infrared spectroscopy, etc. on the steel sheet surface, that is, the degree of concentration of the above elements (M), or the detection intensity ratio of the surface layer of products of FeO, $Fe_2SiO_4$, and $SiO_2$, i.e., the degree of enrichment (M) of the above products can be used.

Various types of analysis employing X-rays, gamma rays, infrared spectroscopy, etc. can be used to detect the above elements. Analysis conditions are also not particularly limited, for example, when using X-ray fluorescence analysis, a voltage of about 10 kV to 60 kV and a current of about 1 mA to 30 mA are common. In general, increasing the voltage provides more information about the interior of the steel sheet. These measurements can also be used in combination to detect the above elements. Alternatively, if sufficient data is already available or if changes in intensity can be predicted at specific locations based on equipment properties, the concentration distribution may be derived by numerical simulation from the temperature and atmosphere conditions of decarburization annealing.

The above on-line analysis is preferably performed after decarburization annealing and before application of the annealing separator but may be performed after the application if the annealing separator contains no elements to be measured.

Although, the above online analysis is preferably performed on the front and back surfaces of the steel sheet over the entire length and entire width of the coil, if to what extent differences occur in specific areas (e.g., differences between the front and back of a steel sheet) is known in advance from past data or equipment properties, analysis of the areas excluding areas with differences (e.g., only the front side) is also acceptable.

After the above decarburization annealing is complete, an annealing separator mainly composed of MgO is slurried and applied to the steel sheet surface of the cold-rolled sheet, the cold-rolled sheet is then dried. The above annealing separator comprises 50 mass % or more of MgO, which is the main component. If a MgO content is less than 50 mass %, the main component of film formation is insufficient, and a good film cannot be obtained. Furthermore, the MgO content is preferably 70 mass % or more.

The annealing separator mainly composed of MgO can be supplemented as appropriate with conventionally known additives, such as Ti and compounds of Na, Al, Sb, Ca, etc. In this case, the total content of the above compounds is less than 50 mass %. If the content of such compounds is 50 mass % or more, the MgO content is less than 50 mass %, which causes poor formation of forsterite film. More preferably, the total content of such compounds is 30 mass % or less. The amount of annealing separator applied to the steel sheet surface, as well as hydration temperature and time, are within known limits and not particularly limited.

The steel sheet with the applied annealing separator is then subjected to heating and held in the annealing furnace with the steel sheet coil placed upended (with the direction of the coil axis vertical) to cause secondary recrystallization and then subjected to a purifying final annealing. Such final annealing preferably heats and maintains the coil at a temperature of 1100° C. or more to cause secondary recrystallization. To complete the secondary recrystallization, the heating rate in a range from 700° C. to 1100° C. is preferably 2° C./h or more when completing the secondary recrystallization during heating. The heating rate is preferably 50° C./h or less. When secondary recrystallization occurs while the temperature is held, the temperature in the above holding temperature range is preferably held for 25 h or more. In all cases, the atmosphere is an inert atmosphere such as $N_2$ or Ar at 500° C. or less. At a temperature from 500° C. to 1100° C., the atmosphere is switched from such an inert atmosphere to an atmosphere containing more than 5% or more of $H_2$. If the switching temperature is less than 500° C., there is a risk of explosion, whereas if the temperature exceeds 1100° C., the inert gas is allowed to flow in for too long and the film deteriorates.

In final annealing, to form a forsterite film (base film) and remove impurities contained in the steel sheet after secondary recrystallization has occurred, the cold-rolled steel sheet is subjected to purification treatment in which it is held at a predetermined temperature for a predetermined holding time. The temperature is preferably 1120° C. or more. The temperature is preferably 1250° C. or less. The holding time is preferably 2 h or more. The holding time is preferably 50 h or less. If the temperature of the purification treatment is less than 1120° C. or the holding time is less than 2 hours, purification is insufficient. On the other hand, if the temperature of the purification treatment exceeds 1250° C. or the holding time exceeds 50 h, the coil buckles and deforms, causing shape defects and the yield rate to decrease. More preferably, the lower limit of the temperature of the purification treatment is 1150° C. On the other hand, the upper limit of the temperature of the purification treatment is 1230° C. More preferably, the lower limit of the holding time of the purification treatment is 3 h. On the other hand, the upper limit of the holding time of the purification treatment is 40 h.

In the present disclosure and prior to the final annealing, the steel sheet may be subjected to preliminary heat treatment in which the steel sheet is held at a predetermined temperature for a predetermined time and to soaking which homogenizes element concentrations on the front and back surfaces of the steel sheet. The soaking is performed at a predetermined temperature for a predetermined holding time. The temperature is preferably 800° C. or more. The temperature is preferably 950° C. or less. The holding time is preferably 5 h or more. The holding time is preferably 200 h or less. If the above temperature is less than 800° C. or the time is less than 5 h, the above effect cannot be sufficiently obtained. On the other hand, if the above temperature exceeds 950° C. or the time exceeds 200 h, MgO activity is lost, and the film properties deteriorate.

The soaking may be performed separately from final annealing, or it may be incorporated into a first half of final annealing with final annealing following the soaking. Since the conditions of the soaking overlap with the temperature range in which secondary recrystallization occurs, the process of causing secondary recrystallization in the final annealing can be omitted when soaking is applied, regardless of whether soaking is performed separately or incorporated.

In the present disclosure, the conditions of final annealing (control items) in such final annealing may be at least one condition selected from the above-mentioned conditions of final annealing, such as the condition of soaking, and a plurality of conditions may be selected. In the present disclosure, even if soaking is performed separately from final annealing, the conditions of the soaking are regarded as one of the conditions of the final annealing.

When the above-described soaking and final annealing are performed separately, the average heating rate from room temperature to the above purification treatment temperature is preferably 5° C./h or more. The average heating rate is preferably 50° C./h or less. The average heating rate is more preferably 8° C./h or more. On the other hand, the average heating rate is more preferably 30° C./h or less. When soaking is incorporated into final annealing, the average heating rate from the soaking temperature to the purification treatment temperature during the subsequent final annealing after the soaking is completed is preferably 5° C./h or more. The average heating rate is preferably 50° C./h or less. The average heating rate is more preferably 8° C./h or more. On the other hand, the average heating rate is more preferably 30° C./h or less.

The aforementioned final annealing is performed with the cold-rolled sheet wound into coil form, which takes time for heat diffusion and causes temperature differences within the coil. Such temperature differences may be 500° C. or more in some cases.

Therefore, even if the conditions for final annealing are set based on the above-described heating pattern, the temperature difference varies greatly depending on the position in the coil such that it is necessary for the temperature (set value) at each position (section) in the coil in the present disclosure to be determined by actual measurement or simulation.

Any various proposed temperature simulation method, such as finite difference method, finite element method, etc., may be used as a simulation method. In addition, thermocouples or other temperature measuring devices are desirably attached to each coil to measure the temperature and are considered in the calculation of such simulations to further increase the accuracy of the calculation.

Using such a method matches the results of monitoring the decarburization annealed sheet [enriched component index (M)] with the control items of final annealing as described above. One or more of heating rate, switching temperature to a $H_2$-containing atmosphere, soaking time, and soaking temperature can be selected as appropriate as control items of final annealing to be matched.

It is generally known that the optimum conditions for final annealing vary depending on the quality of the internal oxidation film formed by decarburization annealing. For example, in a decarburization annealed sheet in which a large amount of Fe oxide is formed in the internal oxidation film, the Fe oxide decomposes during final annealing and generates oxygen content, which adversely affects the film. For this reason, lowering the introduction temperature of $H_2$ in the annealing atmosphere is effective in reducing Fe oxides before they decompose. In contrast, under conditions where little Fe oxide is formed, the amount of internal oxidation film is small and there is little forsterite material. Therefore, it is necessary to supply oxygen components to the film material through oxidation during final annealing by increasing the temperature at which $H_2$ is introduced during final annealing.

When making such relationships correspond to the indexes mentioned above, the film formation is more likely to occur when the index (M) of enriched components on the surface of the decarburization annealed sheet, that is the concentration (intensity) of O, Mn, Al, or P, or the concentration (intensity ratio) of either FeO or $Fe_2SiO_4$ of a product oxide, increases, and therefore it is effective to change the control items of final annealing, such as reducing the temperature increase rate during final annealing, lowering the temperature at which the $H_2$-containing atmosphere is switched, or shortening the soaking time.

Since the film formation is relatively less likely to occur as the Si content of the decarburization annealed sheet increases, it is effective to increase the heating rate during final annealing, to increase the temperature at which the $H_2$-containing atmosphere is switched, or to prolong the soaking time.

After the above final annealing, steel sheets are preferably subjected to water washing, brushing or pickling to remove any unreacted annealing separator adhering to the steel sheet surface, and then flattening annealing and shape adjustment. Thereby preventing deterioration of magnetic properties due to coil set in the coil because final annealing is performed with the steel sheet wound into a coil.

When product sheets of grain-oriented electrical steel sheet are laminated and used, the steel sheet surface preferably has an insulating coating. In particular, when iron loss properties are important, it is preferable to apply a tensioning film that imparts tension to the steel sheet as an insulating film. The insulating coating may be applied during the flattening annealing, or the insulating coating may be applied before or after the flattening annealing.

The steel sheet may also be subjected to magnetic domain refining treatment to further reduce iron loss. Conventional known methods of magnetic domain refining which may be used include etching to form grooves on the surface of steel sheets cold-rolled to the final sheet thickness and irradiating the steel sheet surface of a product sheet with a laser or a plasma to introduce linear or point-like thermal strain or impact strain.

Example 1

Steel containing C: 0.05 mass %, Si: 3.6 mass %, Mn: 0.08 mass %, Al: 0.022 mass %, Se: 0.02 mass %, Sb: 0.07 mass %, with the balance being Fe and unavoidable impurities was smelted to obtain a steel material (slab) by continuous casting. The slab was then heated to 1390° C., hot rolled to obtain a hot-rolled sheet with a sheet thickness of 2.6 mm, the hot-rolled sheet was subjected to hot-rolled sheet annealing at 1000° C. for 60 seconds, primary cold rolling to an intermediate sheet thickness of 1.8 mm, intermediate annealing at 1100° C. for 80 seconds, and then subjected to secondary cold rolled to obtain a cold-rolled sheet with a final thickness of 0.23 mm.

Next, the cold-rolled sheet was then passed through a horizontal (sideways) continuous annealing furnace, and subjected to decarburization annealing, which also serves as primary recrystallization annealing, in which the cold-rolled sheet is heated in a heating process at a heating rate of 500° C./s in a range of 500° C. to 700° C., and then held at 800° C. for 150 seconds. In the decarburization annealing, atmosphere gas with a vol % ratio of $H_2:N_2=50:50$ was supplied from above and below the annealing furnace. After the decarburization annealing was completed and before the steel sheet was wound into a coil, the intensity ratios of $Fe_2SiO_4$, $SiO_2$, and FeO were measured using an on-line X-ray fluorescence system. The measured values were quantified as ($Fe_2SiO_4$ intensity ratio)/(sum of $SiO_2$, $Fe_2SiO_4$, and FeO intensity ratios), which were measured in sections of 50 mm in the sheet transverse direction and 50 m in the rolling direction to make a map.

In addition, an annealing separator, which is a slurry of powder in water mainly composed of MgO and containing 6 mass % titanium dioxide and 3 mass % strontium sulfate, was applied to the steel sheet surface, the cold-rolled sheet was then dried, wound into coil form for final annealing, and then final annealing was performed. The final annealing subjected the cold-rolled sheet to heating in a range of room temperature to 900° C. at a rate of 10° C./h in a $N_2$ atmosphere and then soaking at 900° C. for 12 to 60 hours. Following this, secondary recrystallization was completed by heating in a range of 900° C. to 950° C. and in a range of 950° C. to 1100° C. at a rate of 10° C./h in an $H_2$ atmosphere, followed by purification treatment by heating in a range of 1100° C. to 1200° C. at a rate of 10° C./h in an $H_2$ atmosphere and holding at 1200° C. for 10 h.

In setting the time for the soaking (soaking time), the inventors analyzed data on the $Fe_2SiO_4$ intensity ratio and the soaking time of coils that had been analyzed until then and confirmed that a good film can be obtained if the soaking time is within the difference ±δ, ±20 hours, from the time (optimum value) obtained from formula (1) below. The following formula (1) is the function f(M).

$$100 - 150 \times (Fe_2SiO_4 \text{ intensity ratio})[h] \quad (1)$$

Based on this, the candidate values ($h_0$, $h_1$, $h_2$ . . . ) for the soaking time at each coil position (each section of the coil) at the end of the soaking were selected from the simulation of temperatures in the coil, and, from the candidate values $h_0$, $h_1$, $h_2$ . . . , a condition that maximizes the total area where the difference ±δ between the (optimum values) obtained from the above formula (1) is within ±20 h was set as the value H. The soaking temperature was set at 900° C., and the soaking time was set to the set value H for each coil based on the thermocouples installed on the furnace hearth in contact with the coil intermediate winding portion.

After any remaining annealing separator on the steel sheet was removed, the coating agent was then applied to the steel sheet which was subjected further to flattening annealed which also serves as baking to form an insulating film (glass film mainly composed of phosphate) on the steel sheet surface.

In producing the above coils 10 times, soaking was performed by setting the set value H according to the above procedure for each coil. The 10 coils thus obtained were visually evaluated for the coating appearance using a surface inspection device. The pass/fail decisions were made according to the criteria described in Experiment 1.

As can be seen from the results of such evaluation, a value as high as 99.8% was obtained for the aforementioned film pass rate on average for 10 coils. In contrast, when the procedure was conducted for 10 coils, not in accordance with the present disclosure, but with soaking at a uniform temperature of 900° C. for 50 hours which is the value when the average value of the $Fe_2SiO_4$ intensity ratio for the entire steel sheet is substituted for the above formula (1), the average film pass rate for the 10 coils was 96.3%.

Example 2

Steel containing C: 0.04 mass %, Si: 3.2 mass %, Mn: 0.08 mass %, Al: 0.006 mass %, Sn: 0.04 mass %, and the balance being Fe and unavoidable impurities was smelted to obtain a steel material (slab) by continuous casting. The slab was then heated to 1260° C., subjected to hot rolling to obtain a hot-rolled sheet with a thickness of 2.8 mm and hot-rolled sheet annealing at 1100° C. for 60 seconds, and then subjected to cold rolling to obtain a cold-rolled sheet with a final thickness of 0.23 mm.

Next, the sheet was then passed through a horizontal (sideways) continuous annealing furnace and subjected to decarburization annealing, which also serves as primary recrystallization annealing, in which the cold-rolled sheet was heated in a heating process at a heating rate of 300° C./s in a range of 500° C. to 700° C., held at 820° C. for 120 seconds, and then further held at 850° C. for 30 seconds. In the decarburization annealing, atmosphere gas with a vol % ratio of $H_2: N_2=50:50$ was supplied from above and below the annealing furnace. After the decarburization annealing was completed and before the steel sheet was wound into a coil, each intensity (concentration) distribution of O, Si, Al, Mn, and P was measured using an on-line X-ray fluorescence system. The measured values measured in sections of 50 mm in the sheet transverse direction and 50 m in the rolling direction to make a map.

In addition, an annealing separator, which is a slurry of powder in water mainly composed of MgO and containing 4 mass % titanium dioxide and 2 mass % strontium sulfate, was applied to the steel sheet surface, the cold-rolled sheet was then dried, wound into coil form for final annealing, and then final annealing was performed. The final annealing subjected the cold-rolled sheet to purification treatment in which the cold-rolled sheet was heated in a range of room temperature to 950° C. at a heating rate of 10° C./h in a $N_2$ atmosphere, heated in a range of 950° C. to 1100° C. at various heating rates in a H₂ atmosphere, further heated in a range of 1100° C. to 1200° C. at a heating rate of 10° C./h in a H₂ atmosphere, and then held at a temperature of 1200° C. for 10 h.

Here, the procedure for setting the heating rate in a range of 950° C. to 1100° C. was based on the data analysis of the intensity of each element [enriched component index (M)] and the heating rate in the coil that had been analyzed until then, and the optimal heating rate (optimum value) was determined for each coil. Furthermore, the heating rate (the candidate values $h_0, h_1, h_2 \ldots$) at each coil position (each section of the coil) was obtained from the simulation of temperatures in the coil. The candidate setting value that maximizes the area where the difference between the optimum heating rate (optimum value) obtained from the intensity of each element above and the heating rate of each position (each section of the coil) in such simulation of temperatures is within a predetermined temperature increase rate ($\delta$) was set as the value H.

Specifically, when the peak intensities of O, Si, Al, Mn, and P are P(O), P(Si), P(Al), P(Mn), and P(P), respectively, $$f(O, Si, Mn, P) = 8.8 \times P(O) - 1.1 \times P(Si) - 11 \times P(Al) - 13 \times P(Mn) + 6.0 \times P(P) + 88 (°C./h) \quad (2)$$

The condition that maximizes the total area of sections where the difference $\pm\delta$ is $\pm 4°$ C./h from the (optimum value) obtained by formula (2), was set as the candidate setting value. The heating rate was set based on measurements with thermocouples installed on the furnace hearth in contact with the coil intermediate winding portion. Formula (2) is the function f(M).

After any remaining annealing separator on the steel sheet was removed, the coating agent was then applied to the steel sheet which was subjected further to flattening annealed which also serves as baking to form an insulating film (glass film mainly composed of phosphate) on the steel sheet surface.

In producing the above coils 10 times, heating was performed in a range of 950° C. to 1100° C. by setting the set value H according to the above procedure for each coil. The 10 coils thus obtained were visually evaluated for the coating appearance using a surface inspection device. The pass/fail decisions were made according to the criteria described in Experiment 1.

When the heating rate (H) that maximizes the (total) area of the range (sections) where $|f(M)-h_0| \leq \delta$ over the entire coil surface was set for each coil in accordance with the present disclosure, an extremely high film acceptance rate of 99.94% was obtained on average for 10 coils. In contrast, when the procedure was conducted for the 10 coils, not in accordance with the present disclosure, but with the heating rate at a uniform 10° C./h (the value obtained by substituting the average value of each intensity for the above formula (2)), the average film pass rate for the 10 coils was 96.5%.

The invention claimed is:

1. A method of determining final annealing conditions for a grain-oriented electrical steel sheet in a process of producing the grain-oriented electrical steel sheet, the process comprising subjecting steel material for the grain-oriented electrical steel sheet to hot rolling to obtain a hot-rolled steel sheet, then subjecting the hot-rolled steel sheet to cold rolling once or cold rolling twice or more with intermediate annealing performed therebetween to obtain a cold-rolled steel sheet, and then subjecting the cold-rolled steel sheet to decarburization annealing which also serves as primary recrystallization annealing, applying an annealing separator to the cold-rolled steel sheet, winding the cold-rolled steel sheet into coil form and then subjecting the cold-rolled steel sheet to final annealing to form a base film, and then flattening annealing to obtain a product sheet, wherein when determining the conditions of the final annealing, the method of determining the final annealing conditions comprises:
1) Dividing, after the decarburization annealing, the steel sheet into a plurality of sections in a rolling direction and a transverse direction, and for each section, obtaining information on an enriched component index (M) in an internal oxidation film in the steel sheet after the decarburization annealing;
2) Deriving, prior to the determining of the conditions for the final annealing and based on evaluation results of effect of control items for the final annealing on properties of the base film, an optimum function f(M) of the control items for the final annealing to the enriched component index (M) of the final annealing with respect to an enriched component;
3) Obtaining, for the entire steel sheet, information on a distribution of the control items of each section for a plurality of candidate values that are set values (H) of the control items for the final annealing; and
4) Determining whether the distribution of the control items for each section is within a predetermined tolerance ($\pm\delta$) to f(M) and selecting, from the plurality of candidate values, the set values (H) of the control items where the total area of the sections within the tolerance value is a maximum.

2. The method of determining the final annealing conditions for a grain-oriented electrical steel sheet according to claim 1, wherein the enriched component index (M) is one or more of O concentration, Si concentration, Al concentration, Mn concentration, P concentration, $Fe_2SiO_4$ intensity ratio, $SiO_2$ intensity ratio, and FeO intensity ratio on the steel sheet surface.

3. The method of determining the final annealing conditions for a grain-oriented electrical steel sheet according to claim 1, wherein the control items for the final annealing are one or more of a final annealing heating rate in a range of 950° C. to 1100° C., an atmosphere switching temperature, a soaking time, and a soaking temperature.

4. A method of producing a grain-oriented electrical steel sheet, comprising using the method of determining the final annealing conditions according to claim 1.

5. The method of determining the final annealing conditions for a grain-oriented electrical steel sheet according to claim 2, wherein the control items for the final annealing are one or more of a final annealing heating rate in a range of 950° C. to 1100° C., an atmosphere switching temperature, a soaking time, and a soaking temperature.

6. A method of producing a grain-oriented electrical steel sheet, comprising using the method of determining the final annealing conditions according to claim 2.

7. A method of producing a grain-oriented electrical steel sheet, comprising using the method of determining the final annealing conditions according to claim 3.

8. A method of producing a grain-oriented electrical steel sheet, comprising using the method of determining the final annealing conditions according to claim 5.

* * * * *